United States Patent [19]

Heidemeyer et al.

[11] Patent Number: 4,533,011
[45] Date of Patent: Aug. 6, 1985

[54] HYBRID DRIVE FOR A VEHICLE, IN PARTICULAR AN AUTOMOBILE

[75] Inventors: Paulus Heidemeyer; Werner Zantopp, both of Wolfsburg, Fed. Rep. of Germany

[73] Assignee: Volkswagenwerk Aktiengesellschaft, Wolfsburg, Fed. Rep. of Germany

[21] Appl. No.: 200,427

[22] Filed: Oct. 24, 1980

[30] Foreign Application Priority Data

Oct. 27, 1979 [DE] Fed. Rep. of Germany ....... 2943554

[51] Int. Cl.³ .............................................. B60K 1/00
[52] U.S. Cl. ...................................... 180/65.2; 290/16
[58] Field of Search .................. 180/165, 65 R, 65 A; 320/62; 290/16, 17, 50; 74/572

[56] References Cited

U.S. PATENT DOCUMENTS

| 1,303,880 | 5/1919 | Fend | 180/65 A |
|---|---|---|---|
| 2,589,453 | 3/1952 | Storsand | 180/165 X |
| 3,493,066 | 2/1970 | Dooley | 180/165 |
| 3,497,026 | 2/1970 | Calvert | 180/165 |
| 3,719,881 | 3/1973 | Shibata et al. | 320/62 |
| 3,791,473 | 2/1974 | Rosen | 180/65 A |
| 3,888,325 | 6/1975 | Reinbeck | 180/65 A |
| 4,099,589 | 7/1978 | Williams | 180/65 A |

FOREIGN PATENT DOCUMENTS

| 2309680 | 9/1974 | Fed. Rep. of Germany. |
| 2501386 | 7/1976 | Fed. Rep. of Germany. |
| 2717256 | 11/1977 | Fed. Rep. of Germany. |

OTHER PUBLICATIONS

*Principles of Automotive Vehicles,* Jan. 1956, Dept. of Army and AirForce, pp. 49–50.
ZEV–Glasers Annalen, 97 (1973, pp. 380–381).
ETZ-A, 98, (1977), pp. 32–37.
Elektrotechnik, 55, (1973), vol. 23, p. 26.

Primary Examiner—Joseph F. Peters, Jr.
Assistant Examiner—Michael Mar
Attorney, Agent, or Firm—Brumbaugh, Graves, Donohue & Raymond

[57] ABSTRACT

A hybrid drive for a vehicle includes an electric engine supplied with energy from an electrical storage device and capable of returning energy back to the storage device. The electric engine is connected with a driving axle of the vehicle by a first disconnecting clutch and to an internal combustion engine arranged in series therewith by a second disconnecting clutch. Operation of these clutches can be independent of each other. In order to save fuel the internal combustion engine is not supplied with a dedicated flywheel, but instead utilizes the rotating masses of the drive between the disconnection points of the two clutches, e.g., the rotating elements of the electric engine, as a flywheel.

33 Claims, 2 Drawing Figures

HYBRID DRIVE FOR A VEHICLE, IN PARTICULAR AN AUTOMOBILE

BACKGROUND OF THE INVENTION

The invention concerns a hybrid drive for a vehicle, in particular an automobile, of the type including an electric engine connected with the driving axle of the vehicle and with an internal combustion engine, as well as methods for operation of such a hybrid drive.

Hybrid drives of this kind are known, e.g., from German Letters of Disclosure No. 21 33 485 as well as Swiss Pat. No. 222,098. In comparison with hybrid drives in which an electric motor for driving the driving axle of a vehicle is selectively supplied current from an energy storage device or an electric generator driven by an internal combustion engine, hybrid drives of this kind offer the essential advantage that a single electric engine can be used at the same time as a driving engine, as a generator for charging of the electrical energy storage device or as a starter motor for the internal combustion engine. The internal combustion engine, the electric engine and the driving axle of the vehicle are connected in series when this type of hybrid drive is present. Between the internal combustion engine and the electric engine, on the one hand, and between the electric engine and the driving axle, on the other hand, there are inserted respective disconnecting clutches, whereby, depending on need, none, only one of the two clutches, or both disconnecting clutches are engaged.

The replacement of the flywheel of the internal combustion engine of a hybrid drive, consisting of an internal combustion engine and an electric engine, by the mass of the rotor components of the electric engine, is known from German Letters of Disclosure No. 24 00 760. In this known arrangement, the electric engine is constructed in the form of a built-up rotor motor which acts not only as an electric drive motor, but at the same time takes over the coupling tasks, i.e. it acts as a clutch. Further with this construction the flywheel mass of the electric engine, which collaborates with the internal combustion engine, is integral with the combustion engine-side clutch component of the electric engine so that upon disconnection of the electric engine, when it is acting as a clutch, the flywheel mass always remains connected rigidly with the internal combusion engine.

SUMMARY OF THE INVENTION

It is the purpose of the invention to create a more efficient hybrid drive, comprised of an electric engine connected both to the driving axle of a vehicle and an internal combustion engine, and to improve its usefulness and controllability. In particular, its response to control is to be increased and at the same time, the fuel consumption of its internal combustion engine is to be reduced. This purpose is attained in accordance with the invention by locating disconnection clutches between the electrical engine and the drive shaft, on the one hand, and between the electrical engine and the internal combustion engine, on the other hand, and by using the rotating masses of the drive between the clutches as the flywheel mass for the internal combustion engine.

Due to the fact that the internal combustion engine in accordance with the invention does not comprise a flywheel, and the flywheel mass required for its operation is an integral component of the rotating masses of the drive between the disconnection points of the two disconnecting clutches, there results not only a reduction in weight, which is favorable from the point of view of acceleration and energy consumption of the total vehicle, but also the possibility of periodic connection and disconnection of the internal combustion engine in suitable operating ranges during travel. The periodic connection and disconnection of this engine also results in a further substantial reduction in fuel needs. Due to the construction of the drive without a flywheel for the internal combustion engine, this engine stops practically without delay when the disconnecting clutch between the internal combustion engine and the electric engine is disengaged. Moreover, it can be started practically without jerking, due to its small mass, upon recoupling with the rotating electric engine. The collaboration between the electric and the internal combustion components thus becomes more effective and more spontaneous.

The proposed construction of the hybrid drive results in several especially favorable operating methods therefor. For example, it becomes possible to save energy and reduce environmental pollution by starting and accelerating only the electric engine and, after a minimum rotational speed thereof has been attained, by starting the internal combustion engine and accelerating it very rapidly to the speed of the electric engine through the use of the kinetic energy stored in the rotating masses between the two disconnecting clutches.

BRIEF DESCRIPTION OF THE DRAWING

The foregoing and other features of the present invention will be described in more detail in connection with the accompanying drawing wherein.

DESCRIPTION OF AN EXEMPLARY EMBODIMENT

Figure 1:
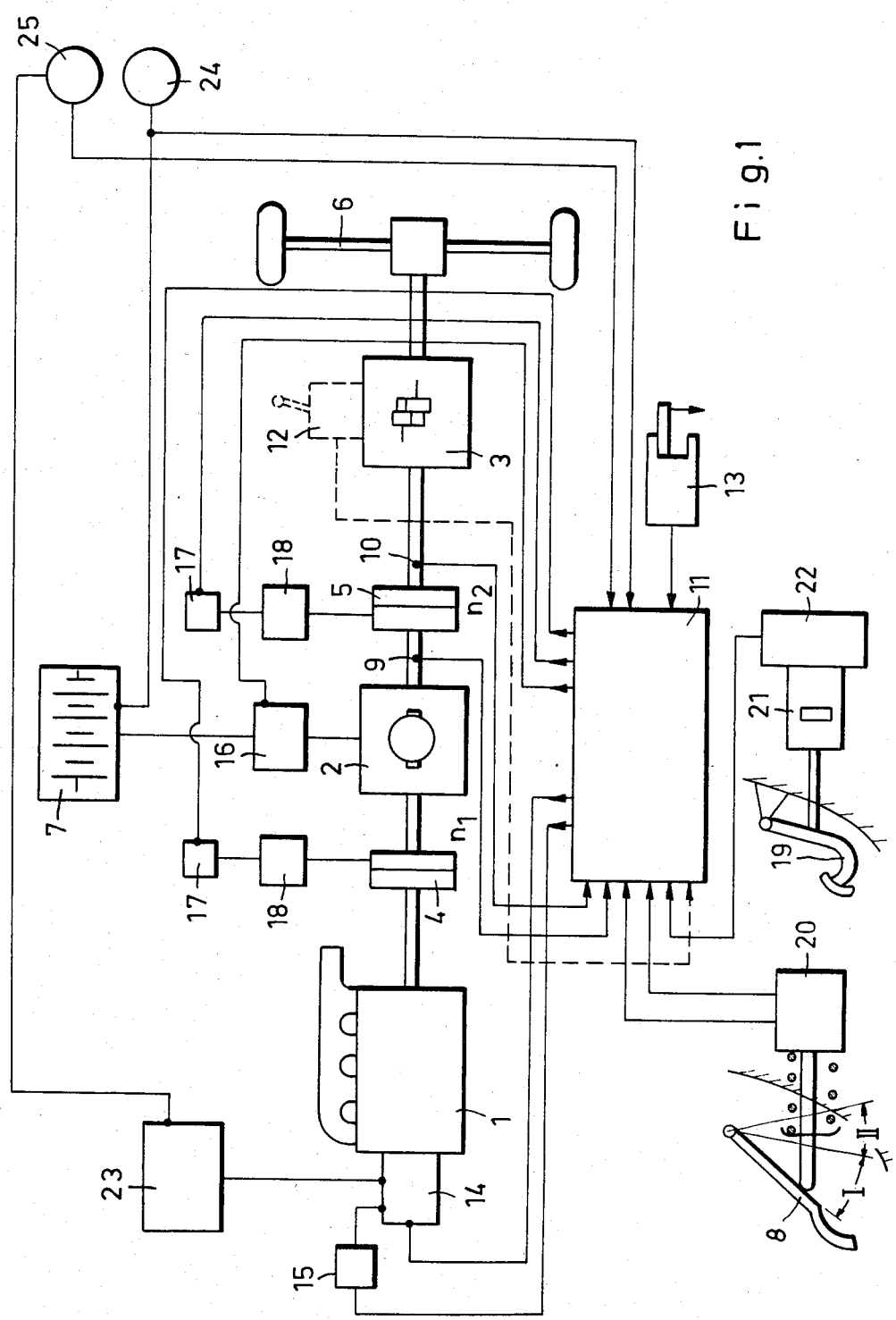
FIG. 1 is an example of an embodiment of the invention shown in schematic form.

In greatly simplified form FIG. 1 illustrates a hybrid drive for a vehicle in a series arrangement and its associated control system. In this drive an internal combustion engine 1 is mechanically connected to an electric engine 2, which in turn is electrically connected to a battery or other electrical energy storage device 7 and is mechanically connected to the axle 6 of the vehicle. In particular, the rotor shaft of the electric engine 2 is connected via a first disconnecting clutch 5 and a transmission 3 with the driven axle 6, and is also connected via a second disconnecting clutch 4 with the output shaft of the internal combustion engine 1. In accordance with operational demands and/or the wishes of the operator, the two disconnecting clutches 4 and 5 can be engaged and disengaged by means of final control elements 17 and 18, which are illustrated only in block form in the drawing. Electro-pneumatic final control elements 18 driven via electromagnetic solenoids or valves 17 may be used here to advantage.

The internal combustion engine 1 is constructed without the customary flywheel. The flywheel mass which is absolutely necessary for operation of the internal combustion engine has been integrated into the rotating mass of the section of the drive train between the disconnection points of the two disconnecting clutches 4 and 5. Depending on structural requirements, the necessary flywheel mass may be integrated, at least in part, in the rotating portion of the electric engine 2 or, at least in part, in a segment of at least one of the two disconnecting clutches 4 and 5 associated with the electric engine. However, in general the rotating rotor mass of the electric engine 2 should be sufficient for proper operation of the internal combustion engine 1. The construction of the internal combustion engine without a dedicated flywheel allows the engine, due to its small mass, to be accelerated rapidly and without jerking to a given speed from its stopped state, which means that it reacts very spontaneously. On the other hand, the internal combustion engine will stop practically without delay under no load conditions and without the effective flywheel mass, even if the ignition is connected and the fuel supply is ample. This applies in any case to engines with torque diagrams which are not constantly positive. In engines with a constantly positive torque diagram, e.g. six-cylinder engines, the fuel supply may have to be interrupted in order to stop them. The fact that the ignition need not be disconnected during the stopping process offers the decisive advantage that non-combusted fuel components or larger noxious substance emissions will not be produced.

For guiding the interaction of the individual final control elements, switching devices and control components in a predetermined and coordinated manner, there is provided an electronic control system 11, which in FIG. 1 is indicated only in block diagram form. This central electronic control system, in accordance with control signals and/or actual and desired value signals received by it, delivers control signals needed for the operation of the final control elements 17, 18 of the two disconnecting clutches, the final-control elements 14, 15 of the internal combustion engine 1 and the control element 16 of the electric engine 2.

Starting of a vehicle equipped with the hybrid drive occurs in a known manner exclusively with the help of the electric engine 2, towards which end the second disconnecting clutch 4 is disengaged by the corresponding control devices. The internal combustion engine 1, which is thereby separated from its flywheel mass, is not supplied with fuel from its fuel tank 23, at least during this starting process. In general, the ignition will also remain disconnected. Depending on the type of electric engine used, as well as the manner of control chosen—i.e., field regulation or combined armature/field regulation—either the second disconnecting clutch 4 alone or both disconnecting clutches 4 and 5 are disengaged during the starting process. In the former case, the electric engine 2 is connected with the driving axle 6 by way of the engaged first disconnecting clutch 5 as well as the transmission 3 so that it must run up from a stopped condition under load. This is possible only in the presence of armature current or armature voltage regulation. In the second case, when both disconnecting clutches are disengaged, the electric engine 2 alone is run up from the stopped condition, i.e., the engine has no load because it is separated from the driving axle 6. In this case, it is also possible to adjust the speed of the electric engine in a manner known per se by means of pure field regulation, inasmuch as, in accordance with the engine characteristic, the lower rotational speed range is passed through without load.

If thereafter the vehicle is to be driven purely electrically, the first disconnecting clutch 5 is engaged after the running-up of the electric engine 2, thereby producing the connection between the driving axle 6 and the electric engine operating as a motor. The desired speed of the vehicle is adjusted conventionally by actuation of an accelerator pedal 8 which, by way of an accelerator electrical switching device 20 shown only in block diagram form, delivers to the central electronic control system 11 a control signal proportional to the accelerator pedal deflection. From this accelerator control signal, the central electronic control system 11 forms a corresponding switching signal for the control device 16 of the electric engine 2. Further, by making use of an infinitely variable transmission or a mechanical transmission cooperating with the first disconnecting clutch 5, the adjustment and coordination between the electric engine and the driving axle can be improved and refined.

Operation of the vehicle exclusively by means of the electric engine 2 is advantageous on courses where low emissions and, if possible, noise-free driving are important, e.g., in inner city traffic. Thereby all of the advantages of purely electrical operation are utilized, i.e., upon braking of the vehicle in the known manner, there occurs a change-over of the electric engine from motor operation to generator operation, so that at least part of the kinetic energy of the vehicle dissipated during braking can be supplied in the form of electrical energy to the electrical energy storage device 7. Towards such end, the brake pedal 19 of the vehicle, in a manner known per se, is connected with a main brake cylinder 21 of a customary hydraulic braking system for the vehicle, as well as with a brake electrical switching device 22. Upon actuation of the brake pedal, the brake switching device 22 delivers a control signal to the central electronic control system 11 which in turn causes a change of the electric engine from its motor to its generator operation. The main brake cylinder 21 and the brake electrical switching device 22 are adjusted and arranged in such a manner that initially only the electrical switching device is operated and only subsequently does the main brake cylinder become effective. The brake electrical switching device 22 may be advantageously designed to deliver to the electronic control system 11 a control signal which increases as the pressure of the brake pedal 19 increases, and which initially causes the change-over to generator operation and thereafter causes the engagement of the second disconnecting clutch 4 so that the braking action of the internal combustion engine 1 becomes effective.

If after a purely electrical start and the attainment of a minimum speed for the flywheel masses positioned between the two disconnecting clutches 4 and 5, the internal combustion engine 1 is to be employed as a driving engine, either alone or in collaboration with the electric engine 2, the central electronic control system 11, following the pertinent order by the operator, will cause the second disconnecting clutch 4 to be engaged. Simultaneously, the ignition is engaged and the corresponding fuel is supplied to the mixture formation device 14, whereby the internal combustion engine 1 is started. Due to its smaller mass it is rapidly accelerated to the rotational speed of the electric engine. Depending on the demands of the road travelled, as well as the surroundings, the vehicle operator now has the choice of continuing travel, as necessary or desired, with a driving engine comprised of either a simultaneous series connection of the internal combustion engine 1 and the electric engine 2 or the internal combustion engine 1 alone.

In case the road rises and/or during acceleration phases, the electric engine 2 will be operated in the known manner as an electric motor so as to add torque, i.e., as an effective driving engine. On downgrades and/or during deceleration phases, the electric engine will be operated as a generator supplying current to the electrical energy storage device 7. In the event that the electrical energy storage device 7 should already have its full storage capacity, it is of course also possible to separate electrically separate the electric engine 2 from the electrical energy storage device 7 and to utilize the rotating rotor merely as a flywheel mass for the internal combustion engine 1.

It is possible and advantageous for the accelerator pedal 8, which is common to the internal combustion engine 1 and the electric engine 2, to be designed in a manner whereby, within a first actuation range I, only one of the two engines is effective as a driving engine and, within a successive second actuation range II, both engines are effective as driving engines. Towards such end, the accelerator pedal 8 of the example, which is equipped with the accelerator electrical switching device 20, defines output signals from device 20 that are delivered as control signals to the electronic control system 11. The two aforementioned actuation ranges of the accelerator pedal 8 may be selected such that, within the actuation range I, only the electric engine 2 is effective as an electric motor, whereas within the actuation range II, both the internal combustion engine and the electric engine act as driving motors. In order to utilize even better the possibilities of various uses of the internal combustion engine as well as the electric engine of the hybrid drive, there is provided an electric load system changeover switch 13, actuable, e.g., manually. Switch 13 is in connection with the central electronic control system 11, through whose actuation the association of the first actuation range I of the accelerator pedal 8 with the internal combustion engine 1 and the electric engine 2, respectively, is interchanged. As a result, the possibility of operating the vehicle initially by means of the internal combustion engine, if necessary, is offered in a simple manner.

If the vehicle is to be operated initially by means of the internal combustion engine 1, this engine is started by disengaging the disconnecting clutches 4 and 5, accelerating the electric engine to a minimum speed and thereafter, with the ignition and the fuel supply to the mixture formation device 14 connected, engaging the second disconnecting clutch 4, whereby the internal combustion engine 1 is started. Inasmuch as the internal combustion engine has no flywheel, it will very rapidly accelerate to the speed of the electric engine. If the internal combustion engine 1 is started as described above while the vehicle is at a standstill, it will be necessary—at least when using a mechanical transmission or an infinitely variable speed transmission—to design the first disconnecting clutch 5 as a starting clutch, so that the vehicle can be accelerated from the stopped condition. In such a case, the first disconnecting clutch 5 will then be constructed as an electronically-controllable starting clutch. As such, this clutch will be provided on the transmission side as well as the engine side with speed detection devices 9 and 10, respectively. The measured signals n1 and n2 of these detection devices, in the form of additional load signals, are delivered as actual values to the electronic control system 11 which, following actuation of the shift and selector lever 12 of the transmission 3, are converted into suitable control signals for the final control elements 17, 18 associated with the disconnecting clutch 5. Consequently, the first disconnecting clutch 5 is caused to be engaged in the manner customary for starting clutches.

The spontaneous reactions to control measures, which are due to the construction of the internal combustion engine 1 without a flywheel, are of special advantage in cases in which the internal combustion engine 1 is periodically cut-out and again cut-in, as a function of operating parameters of the vehicle, in order to reduce the fuel consumption. At those operating states at which the flywheel mass of the internal combustion engine, which is concentrated between the two disconnecting clutches 4 and 5, rotates at a speed above the minimum rotational speed and at which the internal combustion engine does not drive the vehicle, i.e., during engine-braking operation, at least the second disconnecting clutch 4 located between the internal combustion engine and the electric engine can be disengaged. This leaves the internal combustion engine without a flywheel and causes it to stop almost without delay. However, the kinetic energy of the rotating masses forming the engine flywheel mass is preserved. At the same time clutch 4 is disengaged, the central electronic control system 11 interrupts the fuel delivery to the mixture formation device 14 and separates the electric engine 2 electrically from the electrical energy storage device 7 if this has not yet occurred. As soon as the rotational speed of the flywheel mass has dropped to the minimum starting speed for the internal combustion engine, the second disconnecting clutch 4 is again engaged and the fuel delivery to the mixture formation device 14 is again reinstated so that the internal combustion engine is started in the aforedescribed manner. Despite the starting and stopping of engine 1, the passengers in the vehicle do not feel any jerking motions that impair their comfort. It is also possible during this operating phase to disengage not only the second disconnecting clutch 4, but also to disengage simultaneously the first disconnecting clutch 5.

The starting and stopping of the internal combustion engine may be obtained advantageously by having the second disconnecting clutch 4, and possibly also the first disconnecting clutch 5, automatically disengaged and the internal combustion engine 1 disconnected from the fuel supply when the accelerator pedal 8 is not actuated. The disconnecting clutch is again engaged and fuel delivery is reinstated when the accelerator pedal is again actuated. In particular, when the cutting-in of the internal combustion engine is caused by actuation of the accelerator pedal 8, it is advantageous to assure, through corresponding control measures, that the flywheel mass speed does not drop below the aforementioned minimum speed. This may be obtained, when both the first and the second disconnecting clutches have been disengaged, by automatically connecting the electric engine 2 with the electrical energy storage device 7 whenever the flywheel mass speed has dropped to the minimum speed, whereby the electric engine 2 operating as a motor accelerates the flywheel mass to a rotational speed above the minimum speed. Thereafter, the electric engine 2 is again disconnected from the electrical energy storage device. When the disconnecting clutches are disengaged, it is also possible to keep the electric engine 2 continuously connected with the electrical energy storage device 7 during this time and to operate it as a motor at a speed which is somewhat above the rotational speed. The losses produced thereby are very small in that the electric engine is operated in the no-load state for all practical purposes.

The energy content of the electrical energy storage device 7 is suitably monitored continuously and displayed to the operator, e.g., by means of an indicator instrument 24. For example, during the operating phases in which the vehicle is driven exclusively by the electric engine, it is possible, when the energy content drops to a minimum value, to cut-in the internal combustion engine 1 by means of the central electronic control system 11 and to take the electric engine 2 out of its motor operation phase. Depending on the requirements of the road travelled, the electric engine can be changed over to generator operation for charging-up of the electrical energy storage device 7 or simply separated electrically therefrom. This continuous monitoring of the energy content of the electrical energy storage device is important because the electric engine 2 is needed not only as a driving engine, but also as a starter motor for the internal combustion engine. Thus it must be at least ensured that the electric engine can be accelerated from a stopped condition to the necessary minimum speed for starting of the internal combustion engine.

It is also of advantage to monitor constantly the fuel supply in the fuel tank 23. In the event that the fuel supply should drop below a minimum value, the internal combustion engine 1 can be cut off while the second disconnecting clutch 4 is disengaged and the electric engine 2 can be changed to motor operation, unless such operation is already present.

During particularly extended downgrades it is preferable to utilize the braking effect of the driving engine so that the braking plant proper of the vehicle is not overburdened. In order to make engine-braking possible during downgrade travel, an electrical switching device, not shown, which is, e.g., manually actuable and acts on the electronic control system 11, can be provided. By means of this switching device, the automatic disengagement of the two disconnecting clutches 4 and 5 as well as the automatic cutting-out of the internal combustion engine above a minimum speed, can be blocked at the option of the operator, if necessary.

For the sake of completeness, it should be mentioned that an automatic transmission may also be used as the transmission gearing. In conjunction with the disconnecting clutch 5 this offers the substantial advantage that in contrast to conventional vehicles with an automatic transmission, the vehicle concerned does not have any creeping tendency while standing. Taken as a whole, the measures provided for result in a vehicle with a hybrid drive which is distinguished by especially good control response and especially small fuel consumption, which is due not only to the particular type of operation, but also to the intentional saving of weight through the utilization of the masses already present for the electrical engine as the flywheel for the internal combustion engine.

Figure 2:
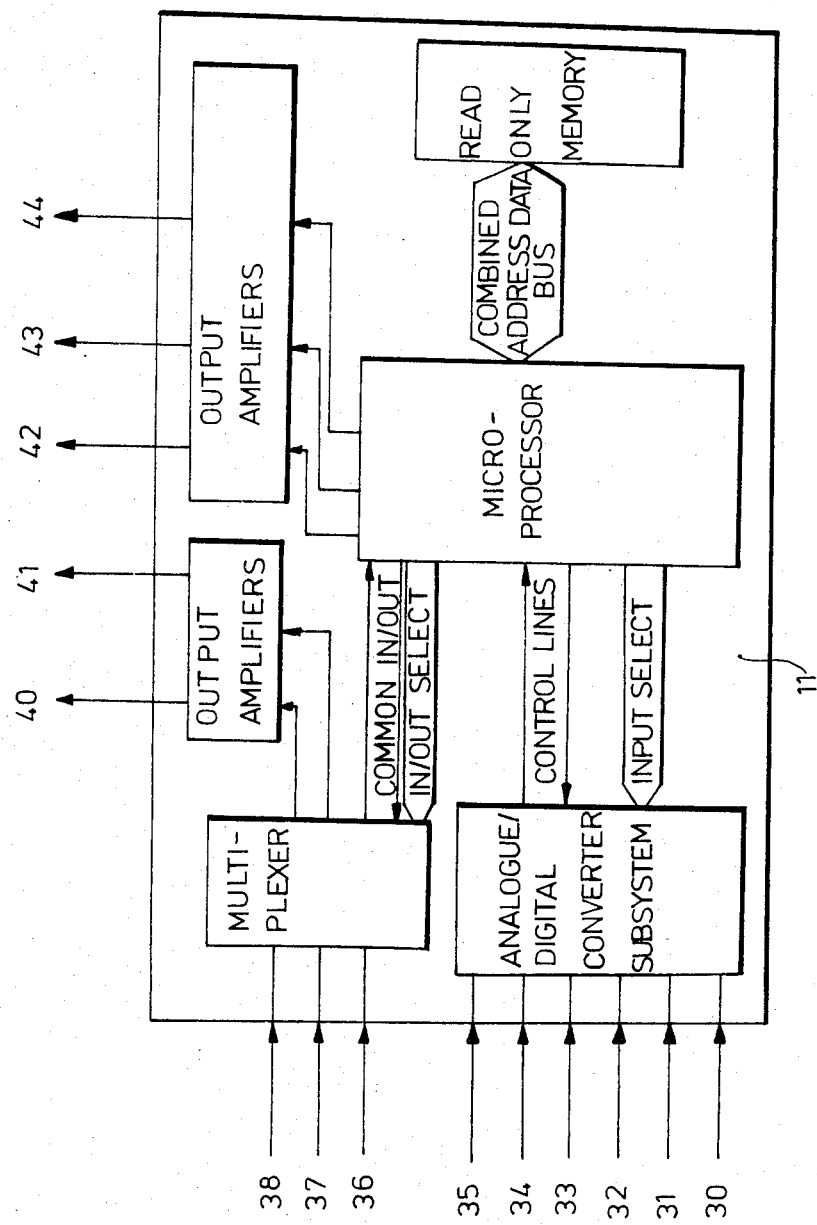
FIG. 2 is an example of an embodiment of a central electronic control system also shown in schematic form.

Preferably, the central electronic control system 11 is a digital-working control unit comprising—as shown in FIG. 2—a microprocessor well-known, which—in cooperation with a memory device, e.g., a so-called "Read only Memory" (ROM), —realizes the control functions mentioned above. According to their type input-signals are supplied to the microprocessor either via an analog/digital converter-subsystem or via a multiplexer, both well-known in the art.

Preferably, the output-signals of the microprocessor and of the multiplexer are supplied to output amplifiers which amplify them to control-signals for the several control elements of the hybrid drive.

In FIG. 2 numbers 30 to 38 represent input-signals and numbers 40 to 44 output-signals or control-signals, respectively. In particular they represent signals from/to:

30 accelerator pedal sensor for first range
31 accelerator pedal sensor for second range
32 combustion engine and/or electric engine speed
33 transmission input speed
34 electrical energy storage device capacity sensor
35 fuel tank capacity sensor
36 brake pedal switch
37 shift and selector lever
38 load system changeover switch
40 fuel cut off valve in mixture formation
41 second disconnecting clutch device control element
42 electric engine control element
43 first disconnecting clutch control element
44 combustion engine control element.

As is well-known, nearly each control function desired can be realized with help of programmable microprocessors. Programming a microprocessor is rather easy for those skilled in the art.

The clutch engagement of the first disconnecting clutch 5, when the vehicle is being initially started from a standing condition, may be controlled, for instance, as described in the co-pending applications Ser. Nos. 061,059, 123,440 or 165,687.

While the invention has been particularly shown and described with reference to a preferred embodiment thereof, it will be understood by those skilled in the art that various changes in form and details may be made therein without departing from the spirit and scope of the invention.

We claim:

1. In a hybrid drive for a vehicle, for example, an automobile, with an electric engine which can be supplied energy from an electrical energy storage device and is capable of supplying energy back into said energy storage device, said electric engine being in connection with a driving axle of the vehicle by means of a first disconnecting clutch and with an internal combustion engine arranged in series therewith by means of a second disconnecting clutch, wherein depending on the need, at least one of: neither of the two clutches, only one of the two clutches, and both clutches are engaged, the improvement wherein the internal combustion engine is designed without a flywheel and the flywheel mass required for its operation is an integral component of the rotating masses of the drive between the disconnection points of the two disconnecting clutches.

2. A hybrid drive as claimed in claim 1, characterized in that the flywheel mass, at least in part, is integrated into the rotating portion of the electric engine.

3. A hybrid drive as claimed in claims 1 or 2, characterized in that the required flywheel mass, at least in part, is integrated into the part of at least one disconnecting clutch that is connected with the electric engine.

4. A hybrid drive as claimed in claims 1 or 2, further including a mechanical transmission collaborating with the first disconnecting clutch and arranged between the first disconnecting clutch and the driving axle of the vehicle.

5. A hybrid dirve as claimed in claims 1 or 2, further including an automatic transmission arranged between the first disconnecting clutch and the driving axle of the vehicle.

6. A hybrid drive as claimed in claims 1 or 2, further including an infinitely variable speed transmission arranged between the first disconnecting clutch and the driving axle of the vehicle.

7. A hybrid drive as claimed in claim 1, further including final control elements associated with the engines and a central electronic control system which, on the basis of control and actual-value signals delivered to it, supplies control signals to the disconnecting clutches and the final control elements.

8. A hybrid drive as claimed in claims 1, 2 or 7, further including a common accelerator pedal associated with the internal combustion engine and with the electric engine, said accelerator pedal having a first actuation region (I) in which only one of the two engines is effective as a driving engine as well as a second actuation region (II), adjacent to the first one, in which both engines are effective as driving engines.

9. A hybrid drive as claimed in claim 8, further including an accelerator electrical switching device in connection with the accelerator pedal, the output signals of the accelerator electrical switching device being delivered as control signals to the electronic control system.

10. A hybrid drive as claimed in claim 9 further including a manually actuable load system changeover switch acting on the electronic control system, actuation of said change-over switch interchanging the association of the first actutation region (I) of the accelerator pedal with the internal combustion engine and the electric engine, respectively.

11. A hybrid drive as claimed in claims 1, 2 or 7, further including a brake electrical switching device connected with a brake pedal of a hydraulic brake system of the vehicle, said brake electrical switching device effecting a change of the electric engine to operation as a generator as well as the operation of a main brake cylinder of the hydraulic brake system of the vehicle.

12. A hybrid drive as claimed in claim 11, characterized in that the brake electrical switching device delivers to the electronic control system a control signal which increases as the pressure of the brake pedal increases, which control signal, up to a first value, causes an increasing generator braking of the electric engine and, above said value, additionally causes the engagement of the second disconnecting clutch as a further engine brake.

13. A hybrid drive as claimed in claims 1, 2, or 7, characterized in that the first disconnecting clutch is designed as an electronically controllable starting clutch.

14. A hybrid drive as claimed in claims 1, 2 or 7, characterized in that electro-pneumatic final control elements are provided for engagement and disengagement of the disconnecting clutches as well as for the control of the supply of fuel and ignition signals to the internal combustion engine.

15. A method for operation of a hybrid drive for a vehicle comprised of an electric engine powered by an electrical energy storage device and connected to the vehicle driving axle by a first disconnecting clutch, said electric engine also being connected to an internal combustion engine in series therewith by a second disconnecting clutch, which internal combustion engine is without a flywheel and instead utilizes the rotating masses between the disconnection points of the disconnecting clutches as a flywheel mass, comprising the steps of:

disengaging the second disconnecting clutch, and
running the electric engine up to a predetermined speed via the energy storage device.

16. A method as claimed in claim 15, characterized in that both disconnecting clutches are disengaged, the electric engine alone is initially accelerated to a minimum rotational speed and thereafter, the first disconnecting clutch in connection with the driving axle is engaged.

17. A method as claimed in claims 15 or 16, characterized in that following attainment of a defined traveling speed and/or a particular load, the second disconnecting clutch is engaged so that the internal combustion engine is connected to the flywheel mass of the drive, thereby starting the internal combustion engine.

18. A method as claimed in claim 15, characterized in that the electric engine is accelerated to a minimum rotational speed while both the disconnecting clutches are disengaged, thereafter the second disconnecting clutch is engaged so that the internal combustion engine is connected to the flywheel mass of the drive, thereby starting the internal combustion engine, and following the starting of the internal combustion engine, the first disconnecting clutch is also engaged.

19. A method as claimed in claims 15, 16, or 18, characterized in that the electric engine is operated electromotively when an increased torque load is applied thereto, due to a rise in the road on which the vehicle travels and/or to acceleration of the vehicle, and the electric engine is operated as a generator on road downgrades and/or during deceleration of the vehicle, whereby electrical energy is supplied to an electrical energy storage device.

20. A method as claimed in claims 15, 16 or 18, characterized in that:
when the flywheel mass rotates at a speed above a minimum speed, the second disconnecting clutch is disengaged, at least during the operating states in which the internal combustion engine does not drive the vehicle, the electric engine is electrically disconnected from the electrical energy storage device and the internal combustion engine is turned off without disconnection of the ignition; and
when the speed of the flywheel mass has dropped to the minimum speed, the second disconnecting clutch is engaged again and the internal combustion engine is again turned on.

21. A method as claimed in claims 15, 16, or 18, for a vehicle equipped with an accelerator pedal characterized in that:
when the accelerator pedal is not actuated, at least the second disconnecting clutch is disengaged and the internal combustion engine is turned off without disconnection of the ignition; and
when the accelerator pedal is again actuated, the second disconnecting clutch is again engaged and the internal combustion engine is turned on again.

22. A method as claimed in claim 20, characterized in that:
both disconnecting clutches are disengaged,
upon the dropping of the flywheel mass speed to the minimum speed, the electric engine is automatically connected with the electrical energy storage device and is accelerated, during operation as an engine, to a speed which is above the minimum speed, and thereafter the electric engine is again disconnected from the electrical energy storage device.

23. A method as claimed in claim 21, characterized in that:

both disconnecting clutches are disengaged, upon the dropping of the flywheel mass speed to the minimum speed, the electric engine is automatically connected with the electrical energy storage device and is accelerated, during operation as an engine, to a speed which is above the minimum speed, and thereafter the electric engine is again disconnected from the electrical energy storage device.

24. A method as claimed in claim 20, characterized in that both disconnecting clutches are disengaged, the electric engine is connected with the electrical energy storage device and is operated as an engine at a rotational speed which is somewhat above the minimum speed.

25. A method as claimed in claim 21, characterized in that both disconnecting clutches are disengaged, the electric engine is connected with the electrical energy storage device and is operated as an engine at a rotational speed which is somewhat above the minimum speed.

26. A method as claimed in claim 20, characterized in that the disengagement of the disconnecting clutches as well as the turning-off of the internal combustion engine is blocked above a minimum speed by means of a manually actuable electric switching arrangement.

27. A method as claimed in claim 21, characterized in that the disengagement of the disconnecting clutches as well as the turning-off of the internal combustion engine is blocked above a minimum speed by means of a manually actuable electric switching arrangement.

28. A method as claimed in claims 15, 16 or 18, characterized in that the energy content of the electrical energy storage device is monitored continuously and upon dropping thereof to a minimum value, the internal combustion engine is automatically connected-in and the electric engine is controlled so as to stop its operation as engine.

29. A method as claimed in claim 28, characterized in that electric engine is separated electrically from the electrical energy storage device.

30. A method as claimed in claim 28, characterized in that the electric engine is controlled so as to change from operation as an engine to operation as a generator.

31. A method as claimed in claims 15, 16, or 18, characterized in that a fuel reserve of the internal combustion engine is monitored continuously and, upon dropping thereof to a minimum value, the electric engine is automatically operated as an electric motor and the internal combustion engine is turned off by disengagement of the second disconnecting clutch.

32. A method as claimed in claim 18, characterized in that the electric engine, following the start of the internal combustion engine, is separated electrically from the electrical energy storage device.

33. A method as claimed in claim 20, characterized in that, at least during the turning-off process to reduce its speed to zero, the ignition of the internal combustion engine is not disconnected.

* * * * *